F. W. STEERE.
ART OF REMOVING TAR FROM GAS.
APPLICATION FILED APR. 24, 1914.
1,130,214. Patented Mar. 2, 1915.
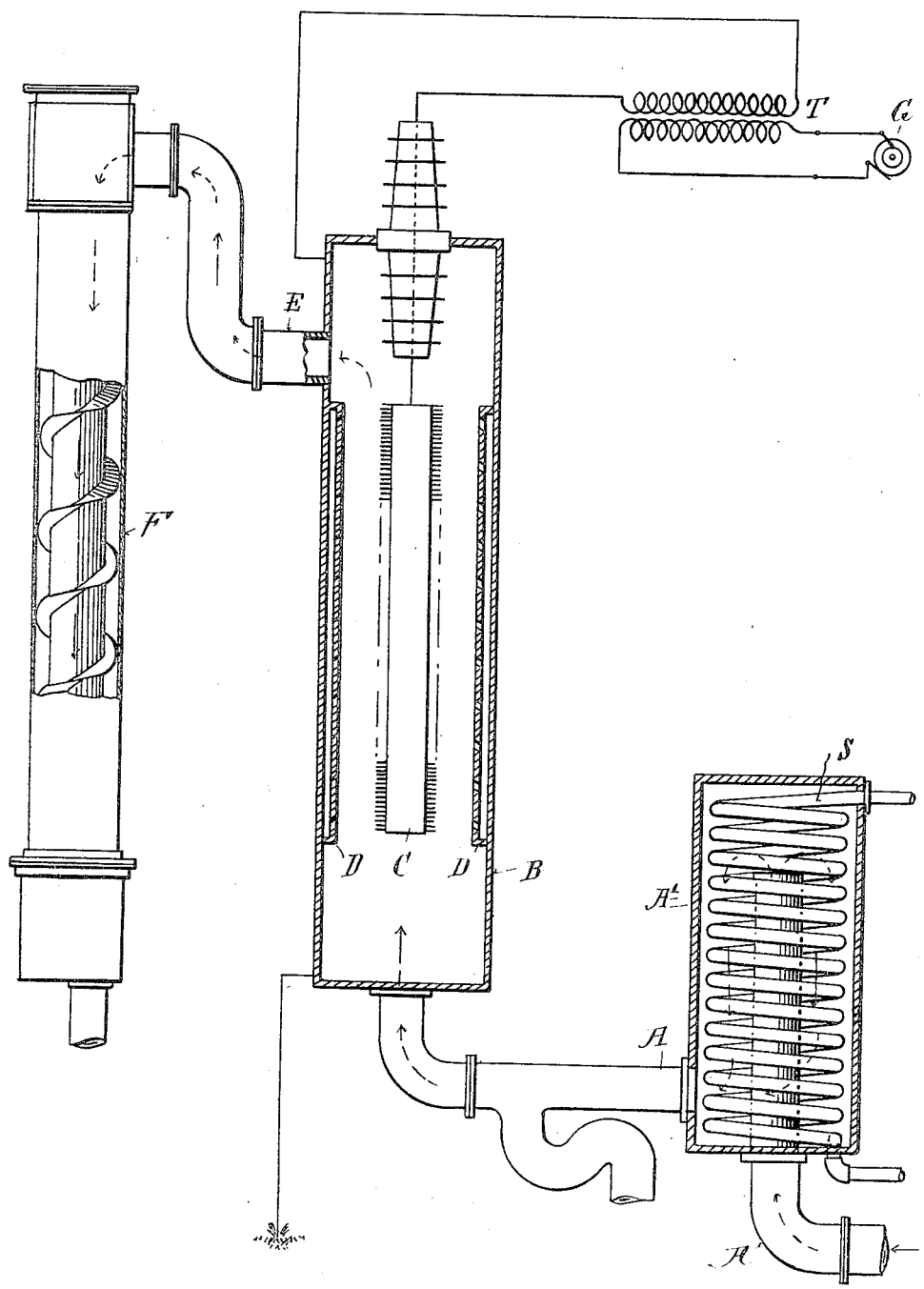

UNITED STATES PATENT OFFICE.

FRANK W. STEERE, OF DETROIT, MICHIGAN, ASSIGNOR TO SEMET-SOLVAY COMPANY, OF SOLVAY, NEW YORK, A CORPORATION OF PENNSYLVANIA.

ART OF REMOVING TAR FROM GAS.

1,130,214.   Specification of Letters Patent.   Patented Mar. 2, 1915.

Application filed April 24, 1914. Serial No. 834,039.

*To all whom it may concern:*

Be it known that I, FRANK W. STEERE, a citizen of the United States, residing at Detroit, in the county of Wayne and State of Michigan, have invented certain new and useful Improvements in the Art of Removing Tar from Gas, of which the following is a specification.

In general terms my invention is an improvement of the process described in applications for Letters Patent heretofore filed by me, Serial Nos. 810,905 and 810,906, (filed Jan. 7, 1914) in which processes I have practically utilized a brush electric discharge to cause an aggregation or coalescing of the tar particles whereby their deposition out of the gas, either under the action of the electric discharge or after the gas has passed out of the electric field, is made possible.

As is well known, the gas produced in the destructive distillation of coal, as in coke ovens comes from the collecting main well charged with water. So also in the case of producer gas, the preliminary washing of the hot gas to remove the dust, soot and other solid impurities therefrom causes a large amount of water to be taken up thereby and in both cases the gas becomes so far cooled in its natural progress before it reaches the point where it can be subjected to the electrical treatment that it enters the electrical field in a super-saturated state, *i. e.*, carrying a considerable quantity of water in the form of vapor. Under these conditions, I have found that a portion of the electric energy available (which is necessarily limited to a voltage that will not cause a disruptive discharge between the electrodes) is used up in coalescing and precipitating fog formed by condensation of water vapor and consequently the tar particles in the gas fail to be acted upon by the electric discharge to an extent measured by the amount of energy acting upon, or used up by the water vapor. I have also found that certain forms of producer gas carrying tarry vapor may be passed through an electric field, under conditions which, with other tar carrying gases, would produce an efficient aggregation of the tar particles, without any result whatever in this respect. This I have discovered is due to the fact that the tar in these gases is of such a nature that it hardens at a relatively high temperature so that after the gas has been washed, as is necessary, to remove the ash, the finely divided tar particles have become so hard that they will not coalesce under the action of the electric discharge and hence pass through the ionizer without appreciable change. I have found that both these difficulties are obviated by preheating the gas before it enters the electric field, so as, in one case, to soften the tar particles and in the other to raise the gas above the temperature at which it will carry condensed vapor particles which can be acted upon by the electric discharge.

The temperature to which the gas is required to be raised will vary with the amount of water carried in the gas, but need not ordinarily exceed 90° C. as the hard tar particles will become fluid below this temperature. By this means not only is the electric energy utilized most efficiently in coalescing the tar particles but such coalescing is effected in cases where otherwise the tar content of the gas will pass through the electric field without being affected in any way.

The invention will be best understood by reference to the accompanying drawing which is a diagrammatic representation of a form of apparatus which may be employed in carrying it into effect.

In carrying my invention into effect the gas coming through gas way, A, from its source or from such washing apparatus (not shown in the drawing) as may have been employed, is first heated in any convenient manner, as by being passed through a chamber, A', containing a steam coil, S. The exact temperature to which the gas is raised will vary with variations in the working conditions and in any given case may be ascertained by inspection, having in mind the results to be accomplished.

Ordinarily where the tar particles carried by the gas have become hardened they will be softened to the required extent and rendered sufficiently fluid to effect the subsequent coalescing of the tar particles by a temperature of approximately 45° C., though a much higher temperature may be applied without militating against the successful operation of the process in this respect. The temperature required to raise the gas above its water saturation point will vary widely with variations in the quantity of water primarily present in the gas but need not ordinarily exceed approximately 90° C. From the chamber, A', the gas passes through an electric field of alternating polarity between electrodes, C. D., contained within a chamber, B. One of the electrodes, as C, is provided with discharging points while the other has a smooth surface and they are operatively connected respectively with the terminals of the secondary coil of a step-up transformer, T, the primary of which receives current from an alternating current generator, G. If desired the electrode, D, may, as shown, be connected to the coil through the wall of the chamber, B, which is connected to ground. The coils of the transformer, T, are so proportioned and a current of such potential is delivered from the generator, G, that a high difference of potential is maintained between the electrodes, C, D, and a brush discharge is produced from the points of the electrode C, the electrodes being so spaced apart as to provide for the production of an effective electric field with the E M F employed and at the same time to prevent sparking between the electrodes.

In practice with the electrodes separated three and one-half inches, I have employed a current of from forty to fifty thousand volts with desirable results. Since no condensed water vapor is carried by the gas the electric energy applied is utilized in acting only on the tar particles carried by the gas and these, being in sufficiently soft or fluid condition are caused to coalesce or aggregate into larger masses. In this condition they are readily removed from the gas either by being deposited within the chamber, B, before they pass out of the electric field, or subsequently. Preferably, however, I cause the gas to pass through the electrode field with such rapidity that the tar particles are removed therefrom without being deposited and remove the tar from the gas subsequently by impact as by causing it to pass through a rotary separator, indicated at F, or other form of impact apparatus.

By this process I am able, upon a commercial scale, to efficiently remove the tar even from those forms of producer gas which have heretofore proven most obdurate in this respect, the advantage of which will be readily understood by those skilled in the art.

What I claim as new and desire to secure by Letters Patent, is:

1. The improvement in the art of removing tar from gas which consists in heating the gas sufficiently to liquefy the tar and raise the gas above its water vapor saturation temperature and then passing the gas through an electric field of alternating polarity between opposed electrodes whereby the tar particles are caused to coalesce.

2. The improvement in the art of removing tar from gas which consists in heating the gas to a temperature above its water vapor saturation temperature and then passing it through an electric field of alternating polarity between opposed electrodes.

3. The improvement in the art of removing tar from gas which consists in first softening the tar particles by heating the gas and then passing the gas through an electric field of alternating polarity between opposed electrodes whereby the tar particles are caused to coalesce.

In testimony whereof, I have hereunto subscribed my name, this 17 day of April A. D., 1914.

FRANK W. STEERE.

Witnesses:
 FRED T. STOW,
 CARL M. CRISSEY.